US008982039B2

(12) United States Patent
Shin et al.

(10) Patent No.: US 8,982,039 B2
(45) Date of Patent: Mar. 17, 2015

(54) DISPLAY DEVICE HAVING LUMINANCE DETECTING OPTICAL SENSOR

(75) Inventors: Minchul Shin, Seoul (KR); Sungyul An, Seoul (KR); Youngsoo Park, Seoul (KR)

(73) Assignee: LG Electronics Inc., Seoul (KR)

( * ) Notice: Subject to any disclaimer, the term of this patent is extended or adjusted under 35 U.S.C. 154(b) by 621 days.

(21) Appl. No.: 13/149,347

(22) Filed: May 31, 2011

(65) Prior Publication Data

US 2012/0120037 A1 May 17, 2012

(30) Foreign Application Priority Data

Nov. 17, 2010 (KR) ........................ 10-2010-0114290

(51) Int. Cl.
*G09G 3/36* (2006.01)
*G06F 3/038* (2013.01)
*G09G 5/00* (2006.01)
*G09G 3/34* (2006.01)

(52) U.S. Cl.
CPC ................ *G09G 3/3406* (2013.01); *G09G 3/36* (2013.01); *G09G 2320/0233* (2013.10); *G09G 2320/064* (2013.01); *G09G 2360/144* (2013.01); *G09G 2360/16* (2013.01)
USPC ........................................... 345/102; 345/207

(58) Field of Classification Search
USPC ......... 345/102, 207; 349/62; 250/216, 227.11
See application file for complete search history.

(56) References Cited

U.S. PATENT DOCUMENTS

| | | | | |
|---|---|---|---|---|
| 2005/0001142 | A1* | 1/2005 | Lauffenburger et al. | 250/205 |
| 2005/0219148 | A1* | 10/2005 | Bayley et al. | 345/1.3 |
| 2007/0091644 | A1 | 4/2007 | Fujishima | |
| 2007/0222741 | A1 | 9/2007 | Itaya | |
| 2010/0007600 | A1 | 1/2010 | Deurenberg et al. | |
| 2010/0053993 | A1 | 3/2010 | Hong et al. | |
| 2012/0169685 | A1* | 7/2012 | Theerawong | 345/207 |

FOREIGN PATENT DOCUMENTS

| | | | |
|---|---|---|---|
| CN | 1955808 | A | 8/1998 |
| CN | 101042499 | A | 9/2007 |
| CN | 101558439 | A | 10/2009 |
| CN | 101666927 | A | 3/2010 |
| EP | 0 861 017 | A2 | 8/1998 |

* cited by examiner

*Primary Examiner* — Joseph Feild
*Assistant Examiner* — Gustavo Polo
(74) *Attorney, Agent, or Firm* — Birch, Stewart, Kolasch & Birch, LLP

(57) ABSTRACT

Provided is a display device. The display device includes a display module on which a lighting source for supplying light is disposed on a back surface thereof, an optical sensor detecting luminance of the light supplied from the lighting source, and a light transmission member disposed between the lighting source and the optical sensor, the light transmission member providing a transmission path of the light generated in the lighting source to transmit the light into the optical sensor.

18 Claims, 12 Drawing Sheets

DISPLAY DEVICE HAVING LUMINANCE DETECTING OPTICAL SENSOR

CROSS-REFERENCE TO RELATED APPLICATIONS

The present application claims the benefit of priority under 35 U.S.C. 119 to Korean Patent Application No. 10-2010-0114290 filed on Nov. 17, 2010 which is hereby incorporated by reference in its entirety.

BACKGROUND

Embodiments relate to a display device, and more particularly, to a display device, which more precisely detects luminance of a lighting source.

Liquid crystal displays (LCDs) display images using electrical and optical properties of liquid crystal. The LCDs have lots of advantageous merits such as thinness, lightness, low power consumption, and low operational voltage so that the LCDs are widely used for a variety of industrial fields.

Such an LCD includes a liquid crystal display panel in which liquid crystal is injected and encapsulated between two sheets of transparent substrates and a voltage is applied to change the orientation of liquid crystal molecules and vary optical transmittance, thereby optically displaying images and a backlight assembly for providing light to the liquid crystal display panel.

A cold cathode fluorescent lamp (CCFL), an external electrode fluorescent lamp (EEFL), a flat fluorescent lamp (FFL), and the like are used as light sources of the backlight assembly.

However, since the CCGL has disadvantages in that it is difficult to realize high-fidelity devices and light, thin, and small devices, light emitting diodes (LEDs) having improved performance such as high luminance, long lifetime, and high color purity are being widely used as lighting sources. Furthermore, since the regulation of a toxic environmental substance such as mercury has been greatly reinforced, the use of the CCFL is being gradually decreased. Thus, the changeover to the LEDs that are the environment-friendly products is a trend.

An LCD using the backlight assembly as a lighting source should have uniform illumination and intensity of the lighting source. However, the lighting source has a significant influence on its surroundings and operation time.

FIG. 1 is a graph of an illumination variation according to an operation time of a general lighting source.

Referring to FIG. 1, the lighting source is changed in illumination in proportion to an operation time.

That is, the lighting source has a limitation that the illumination and intensity thereof are non-uniformly changed by its surroundings and operation time.

Here, when the illumination and intensity of the lighting source are non-uniform, an image displayed on a display device is deteriorated in the image quality. Specifically, when illumination and intensity of a lighting source used for a medical display device are deteriorated, there is a limitation that it is difficult to check precise conditions of patients.

Thus, it is necessary to seek for acceptable solution to uniformly maintain the illumination and intensity of the lighting source in the display device using the backlight assembly as the lighting source.

SUMMARY

Embodiments provide a display device in which a backlight assembly is used as a lighting source and non-uniformity of luminance and intensity of the lighting source is accurately grasped to compensate the luminance and intensity of the lighting source.

The object of the present disclosure is not limited to the aforesaid, but other objects not described herein will be clearly understood by those skilled in the art from descriptions below.

In one embodiment, a display device includes: a display module on which a lighting source for supplying light is disposed on a back surface thereof; an optical sensor detecting luminance of the light supplied from the lighting source; and a light transmission member disposed between the lighting source and the optical sensor, the light transmission member providing a transmission path of the light generated in the lighting source to transmit the light into the optical sensor.

In another embodiment, a display device includes: a display module outputting an image using light supplied through a lighting source disposed on a back surface; a light transmission member in which a through hole for providing a transmission path of the light is defined, the light transmission member being coupled to the back surface of the display module; and an optical sensor disposed on an outlet of the through hole, the optical sensor detecting luminance of light supplied through the through hole.

The details of one or more embodiments are set forth in the accompanying drawings and the description below. Other features will be apparent from the description and drawings, and from the claims.

According to the embodiments, the display device which can precisely detect the luminance and intensity of the lighting source to previously prevent limitations occurring due to non-uniformity of the luminance and intensity of the lighting source, thereby displaying an image with precise luminance.

DETAILED DESCRIPTION OF THE EMBODIMENTS

Exemplary embodiments will be described below. Reference will now be made in detail to the embodiments of the present disclosure, examples of which are illustrated in the accompanying drawings. The spirit and scope of the present disclosure, however, shall not be construed as being limited to embodiments provided herein. Rather, it will be apparent that other embodiments that fall within the spirit and scope of the present disclosure may easily be derived through adding, modifying, and deleting elements herein.

Meanwhile, for the terms used in the present disclosure, general terms widely currently used have been selected as possible as they can. In a specific case, terms arbitrarily selected by an applicant may be used. In this case, since the meaning thereof is described in detail in the detailed description of the specification, the present disclosure should be understood in an aspect of meaning of such terms, not the simple names of such terms.

That is, in following descriptions, the meaning of 'includes', 'comprise', 'including', or 'comprising specifies components or processes but does not exclude other components or processes.

Figure 1:
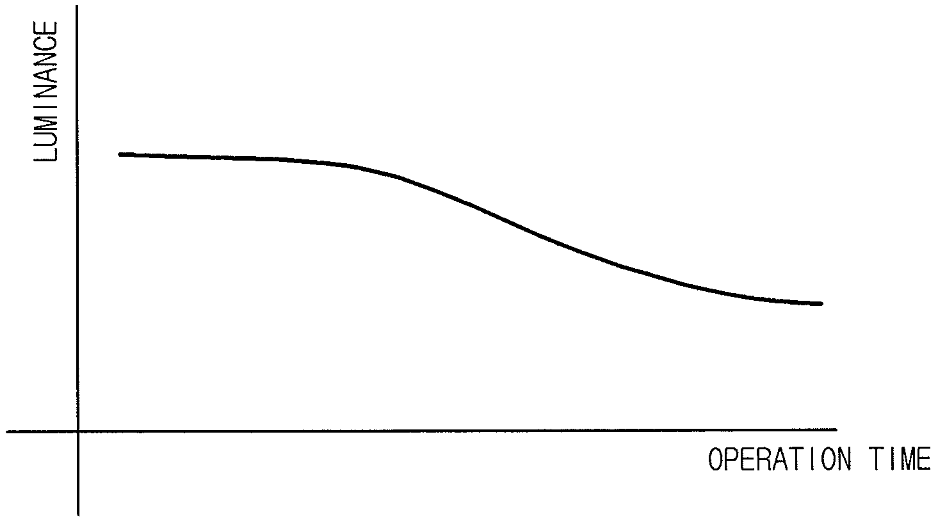
Fig. 1 PRIOR ART
FIG. 1 is a graph of an illumination variation according to an operation time of a general lighting source.
Figure 2:
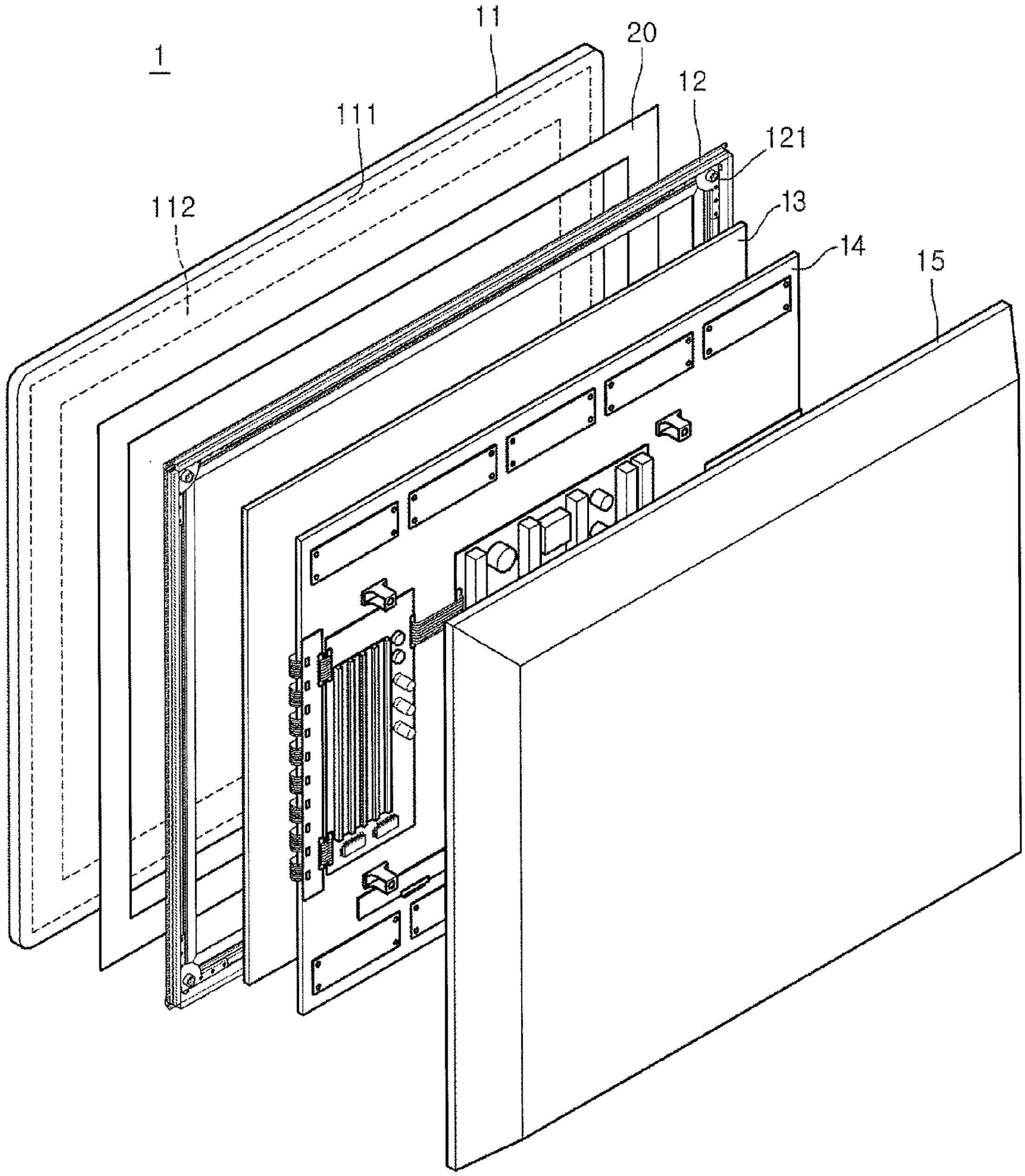
FIG. 2 is an exploded perspective view of a display device according to an embodiment.

FIG. 2 is an exploded perspective view of a display device according to an embodiment.

Referring to FIG. 2, a display device 1 according to an embodiment includes a display module 13 for outputting an image, a front panel 11 for protecting a front surface of the display module 13, a panel fixing unit 12 having a front surface fixed to the front panel 11 and a rear surface fixed to the display module 13, a bracket (not shown) connecting the panel fixing unit 12 to the display module 13, a rear cabinet coupled to a rear side of the front panel 11 to surroundedly protect the display module 13, an adhesion member 20 fixing the panel fixing unit 12 to the front panel 11, and a sensing unit coupled between the rear cabinet 15 and the display module 13 to detect luminance of a backlight assembly 134 included in the display module 13.

In detail, the display module 13 is a device for displaying an image according to a signal inputted into the display device 1. For example, the display module may be a liquid crystal display module (hereinafter, referred to as an LCD module).

The front panel 11 defines a front appearance of the display device 1. For example, an opening (not shown) for viewing the image provided through the display module 13 may be defined in the front panel 11. Alternatively, when the opening is not provided, the front panel 11 may include a plate formed of a transparent material. When the front panel 11 includes the plate formed of the transparent material, the front panel 11 may be formed of any transparent material having a strength above a predetermined level, for example, a tempered glass or a resin member. Also, in a state where the front panel 11 is disposed in the display device 1, a portion of a circumference or the entire circumference of the front panel 11 may be exposed to the outside of the display device 1.

An inner surface 111 of the front panel 11 faces a rear side of the display device 1, and the panel fixing unit is fixed to a panel-side adhesion surface 112 by the adhesion member 20. Also, an opaque film layer (not shown) for preventing the panel fixing unit 12 from being viewed to the front side of the display module 12 and a grounding unit (not shown) for preventing electromagnetic waves generated in the display module 13 from being radiated to the outside of the display device 1 may be further disposed on the inner surface 111.

For example, the panel fixing unit 12 may have a square frame shape with an opened inside space. In a state where the panel fixing part 12 is disposed in the display device 1, the panel fixing part 12 fixes a position of the front panel 11 with respect to the display module 12 and the rear cabinet 15 and defines a lateral appearance of the display device 1. Although the rear cabinet 15 and the front panel 11 do not directly contact each other in the current embodiment, the present disclosure is not limited thereto. For example, when the rear cabinet 15 and the front panel 11 directly contact each other to define the lateral appearance of the display device 1 by the rear cabinet 15, the panel fixing part 12 may not be exposed to the outside and fix only the position of the front panel 11.

A fixing part for fixing the display module 13 or the rear cabinet 15 is disposed on one surface of the panel fixing unit 12 facing a rear side of the display device 1. A fixing part-side adhesion surface 122 is disposed on the other surface of the panel fixing unit 12.

The fixing part-side adhesion surface 122 has a shape corresponding to that of the panel-side adhesion surface 112 of the front panel 11. The adhesion member 20 is disposed on the fixing part-side adhesion surface 122 to provide an adhesion force for fixing the front panel 11 to the panel fixing unit 12.

The adhesion member 20 has a shape corresponding to those of the fixing part-side adhesion surface 122 and the panel-side adhesion surface 112. The adhesion member 20 has one surface adhering to the fixing part-side adhesion surface 122 and the other surface adhering to the panel-side adhesion surface 112 of the front panel 11.

The sensing unit 14 for providing a path of light provided from the backlight assembly 134 disposed on the display module 13 and measuring luminance of the light is disposed between the display module 13 and the rear cabinet 15.

The sensing unit 14 detects the luminance of the light provided through the backlight assembly 134 to transmit data depending on the detected luminance to a control unit 322 that will be described later.

Figure 3:
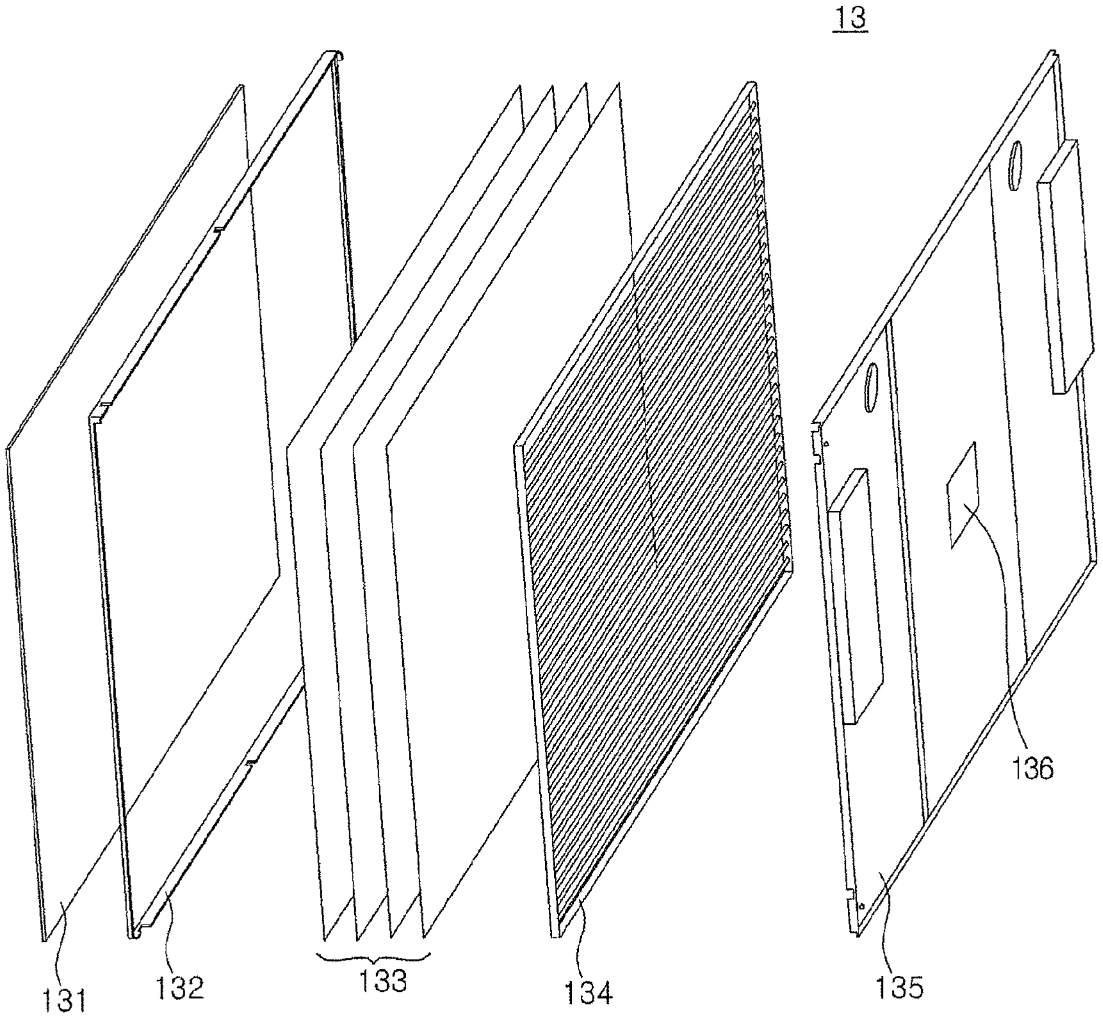
FIG. 3 is a perspective view of a display module according to an embodiment.

FIG. 3 is a perspective view of a display module according to an embodiment.

Referring to FIG. 3, the display module according to an embodiment includes a liquid crystal panel 131 disposed on a front surface of the display module to display an image, a panel guide 132 on which the liquid crystal panel 131 is seated, the backlight assembly 134 provided at a rear side of the liquid crystal panel 131 to provide light, an optical sheet part 133 for processing the light generated in the backlight assembly 134 to provide the processed light to the liquid crystal panel 131, and a bottom cover 135 disposed on a back surface of the display module 130.

For example, the panel guide 132 may have a square frame shape with an opened inside space. Also, the panel guide 132 may be formed of a mold material using a metal or a resin material. The panel guide 132 has one side on which the liquid crystal panel 131 is seated and the other side contacting the bottom cover 135. The optical sheet part 133 and the backlight assembly 134 may be received into an inner space defined by the bottom cover 135 and the panel guide 132.

Also, a separate connection member (not shown) for fixing positions of the optical sheet part 133 and the backlight assembly 134 or connecting the panel guide 132 to the bottom cover 135 may be disposed on the panel guide 132.

An opening 136 having a through-hole shape may be defined in an approximately central portion of the bottom cover 135. The sensing unit 14 is disposed in the opening 136.

The backlight assembly 134 may include a lighting source (not shown) for providing light, a driver (not shown) for driving the lighting source, a reflector (not shown) for reflecting the light generated in the lighting source forward, and a light guide plate for converting the light to planar light. For example, the lighting source may include a lamp or a light emitting diode (hereinafter, referred to as an LED).

The optical sheet part 133 may include a plurality of optical sheets to enhance efficiency of the light generated from the backlight assembly 134. For example, the optical sheets may be a plurality of sheets such as a diffusion sheet, a prism sheet, and a protection sheet.

Figure 4:
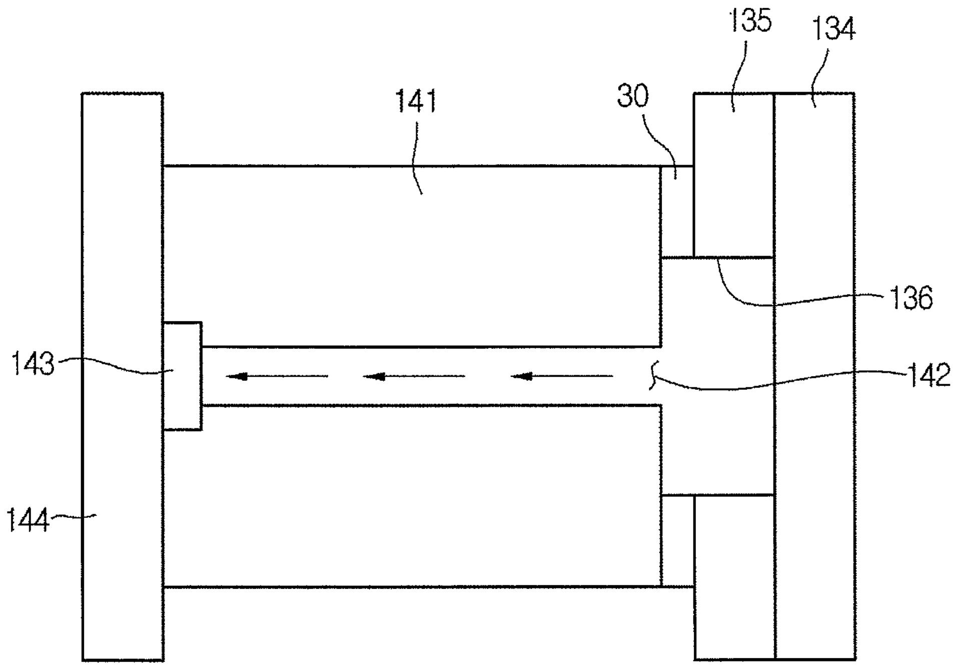
FIG. 4 is a view of a sensing unit according to a first embodiment.

FIG. 4 is a view of a sensing unit according to a first embodiment.

Referring to FIG. 4, a sensing unit 14 includes a light transmission member 141 coupled to a back surface of a display module 13, a through hole 142 that is a light transmission path defined in the light transmission member 141, an optical sensor 143 coupled at a position corresponding to that of the through hole 142 that is the light transmission path, and a printed circuit board (PCB) 144 coupled to the optical sensor 143.

The light transmission member 141 may be a kind of bracket coupled to a back surface of a bottom cover 135 of the display module 13. The light transmission member 141 may be formed of a material such as a metal member, a plastic synthetic resin material, or a sponge. Here, a material blocking ambient light incident from the periphery may be used as the material of the light transmission member 141.

The light transmission member 141 may have the same area as the display module 13. Alternatively, the light transmission member 141 may have an area less than that of the display module 13.

That is, the light transmission member 141 may have an area equal to a light luminance detection area with respect to a backlight assembly 134 in the entire area of the display module 13.

Here, the light transmission member 141 may be coupled at a position corresponding to that of an opening 136 of the bottom cover 135 coupled to a back surface of the display module 13 by a separate auxiliary adhesion member 30.

Here, the auxiliary adhesion member 30 may serve as an attaching member for closely attaching the light transmission member 141 to the display module 13. For example, a tape or sponge may be used as the auxiliary adhesion member 30.

Alternatively, the light transmission member 141 may be fixed using a screw member passing through a PCB 144 (that will be described later) and fixed to the bottom cover 135. When the light transmission member 141 is fixed using a screw, the screw may be used at two positions different from each other. Also, a support member (not shown) for maintaining a distance with the bottom cover 135 may be used at the two positions.

The through hole 142 that is the light transmission path is defined in the light transmission member.

The through hole 142 has an inlet and an outlet. The through hole 142 passes through one surface of the light transmission member 141 and the other surface disposed on a side opposite to that of the one surface.

A reflective member (not shown) for reflecting light may be disposed on an inner surface of the through hole 142.

The backlight assembly 134 of the display module 13 is disposed on the inlet of the through hole 142, and the optical sensor 143 is disposed on the outlet of the through hole 142.

The through hole 142 provides a path of light generated from the light transmission member 141. That is, the through hole 142 provides a light transmission path for transmitting light generated from the backlight assembly 134 disposed on the inlet to the optical sensor 143 disposed on the outlet.

That is, as shown by an arrow illustrated in FIG. 4, the through hole 142 transmits light leaking from the backlight assembly 134 to the optical sensor 143.

Here, when the through hole 142 has the same area as the entire area of the backlight assembly 134, it is difficult to detect more precise luminance value of the light. That is, when the through hole 142 has a relatively large area or the light transmission member 141 itself has a through hole shape, a light detection area of the optical sensor 143 becomes wide. Thus, an error range of the detected luminance value may be relatively large due to the interference by ambient light.

That is, when the through hole 142 has a very large area, since the light generated from the backlight assembly 134 is sporadically detected by the optical sensor 143, it is difficult to more precisely measure the light luminance value.

Thus, the through hole 142 may have an area corresponding to that of a portion of the light detection area set to detect the light luminance value in the entire region of the backlight assembly 134.

That is to say, the light transmission member 141 removes ambient light generated by its surroundings to prevent the ambient light from being transmitted to the optical sensor 143.

Also, the through hole 142 defined in the light transmission member 141 transmits only light provided from the backlight assembly 134 to the optical sensor 143 except for the ambient light.

Here, the through hole 142 defined in the light transmission member 141 may have one of a circular shape, an oval shape, a triangular shape, and a polygonal shape.

The optical sensor 143 is connected to the PCB 144. Also, the optical sensor 143 is disposed at an outlet of the through hole 142 defined in the light transmission member 141 to detect luminance of the light provided through the through hole 142.

As described above, according to the first embodiment, since the light transmission path for transmitting the light generated through the backlight assembly 134 to the optical sensor 143 is provided, the luminance of the backlight assembly may be more precisely detected by the optical sensor 143.

Figure 5:
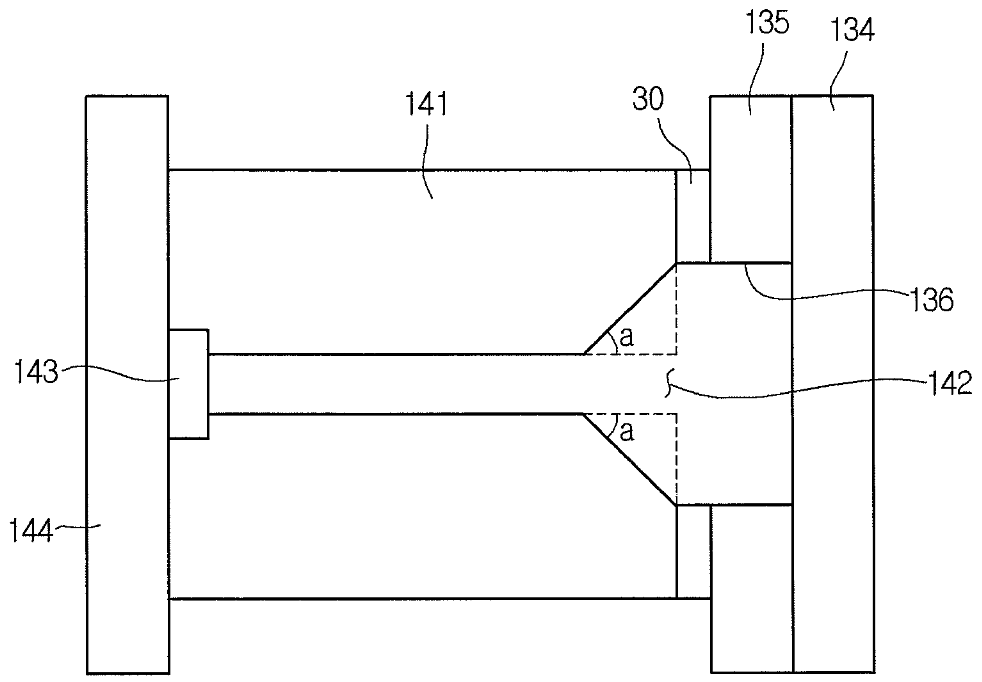
FIG. 5 is a view of a sensing unit according to a second embodiment.

FIG. 5 is a view of a sensing unit according to a second embodiment.

In FIG. 5, the substantially same component as that shown in FIG. 4 will be denoted by the same reference numerals.

Referring to FIG. 5, the sensing unit 14 includes a light transmission member 141 coupled to a back surface of a display module 13, a through hole 142 defined in the light transmission member 141, an optical sensor 143 disposed at a position corresponding to that of the through hole 142, and a PCB coupled to the optical sensor 143.

The light transmission member 141 may be a kind of bracket coupled to the back surface of the display module 13. The light transmission member 141 may be formed of a material such as a metal material, a plastic synthetic resin material, or a sponge. Here, a material blocking ambient light incident from the periphery may be used as the material of the light transmission member 141.

The through hole 142 that is a light transmission path is defined in the light transmission member 141.

The through hole 142 has an inlet and an outlet. The through hole 142 passes through one surface of the light transmission member 141 and the other surface disposed on a side opposite to that of the one surface.

The display module 13 is disposed on the inlet of the through hole 142, and the optical sensor 143 is disposed on the outlet of the through hole 142.

The through hole 142 provides a path of light generated from the light transmission member 141. That is, the through hole 142 provides a light transmission path for transmitting light generated from a backlight assembly 134 disposed on the inlet to the optical sensor 143 disposed on the outlet.

That is, as shown by an arrow illustrated in FIG. 4, the through hole 142 transmits light generated through the backlight assembly 134 to the optical sensor 143.

Here, the inlet of the through hole 142 has an inclined angle (a) having a predetermined angle.

That is, the inclined angle defined on the inlet of the through hole 142 reflects the light generated through the backlight assembly 134 to transmit a more amount of light to the optical sensor 143, thereby more precisely detecting a light luminance value.

That is to say, the inlet of the through hole 142 may have an area greater than that of the outlet to more precisely detect the light luminance value.

As described above, according to the second embodiment, the through hole 142 may be changed in shape to more precisely detect the light luminance value.

Figure 6:
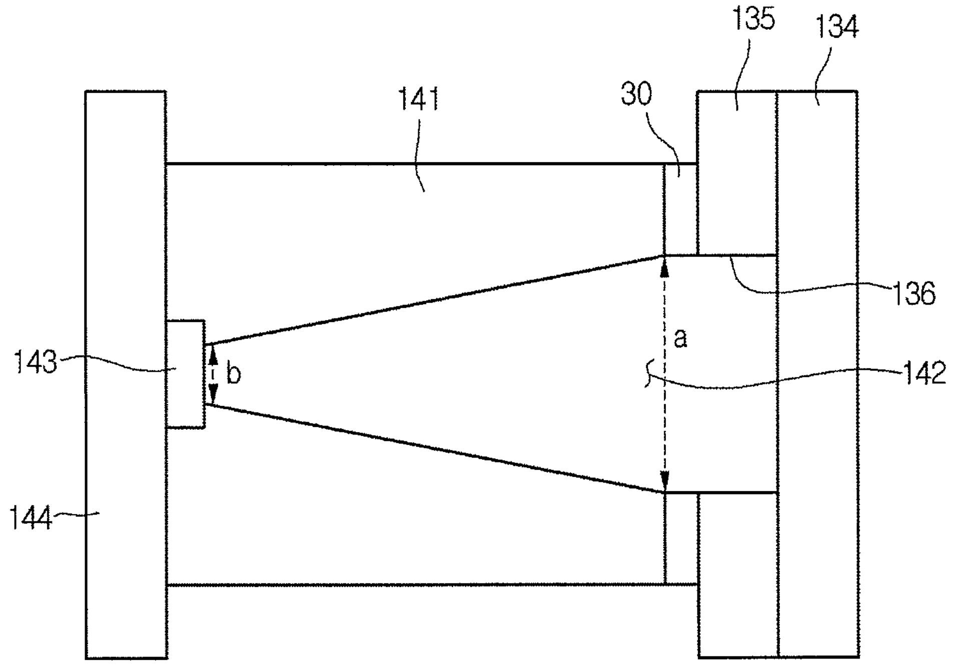
FIG. 6 is a view of a sensing unit according to a third embodiment.

FIG. 6 is a view of a sensing unit according to a third embodiment.

In FIG. 6, the substantially same component as that shown in FIG. 4 will be denoted by the same reference numerals and their descriptions will be omitted.

Referring to FIG. 6, the sensing unit 14 includes a light transmission member 141 coupled to a back surface of a display module 13, a through hole 142 defined in the light transmission member 141, an optical sensor 143 disposed at a position corresponding to that of the through hole 142, and a PCB coupled to the optical sensor 143.

The through hole 142 that is a light transmission path is defined in the light transmission member 141.

Furthermore, the through hole 142 defined in the light transmission member 141 may have a circular or polygonal shape in which an inlet (a) and an outlet (b) of the through hole 141 have areas different from each other. Here, the inlet (a) has an area greater than that of the outlet (b). Thus, light generated from a backlight assembly 134 may be more easily transmitted through the through hole 142.

The optical sensor 143 is connected to the PCB 144. Also, the optical sensor 143 is disposed on the outlet (b) of the through hole 142 defined in the light transmission member 141 to detect luminance of light.

As described above, according to the third embodiment, the through hole 142 may have a circular or polygonal shape in which the inlet (a) has an area greater than that of the outlet (b) to collect the light into the optical sensor 143.

Figure 7:
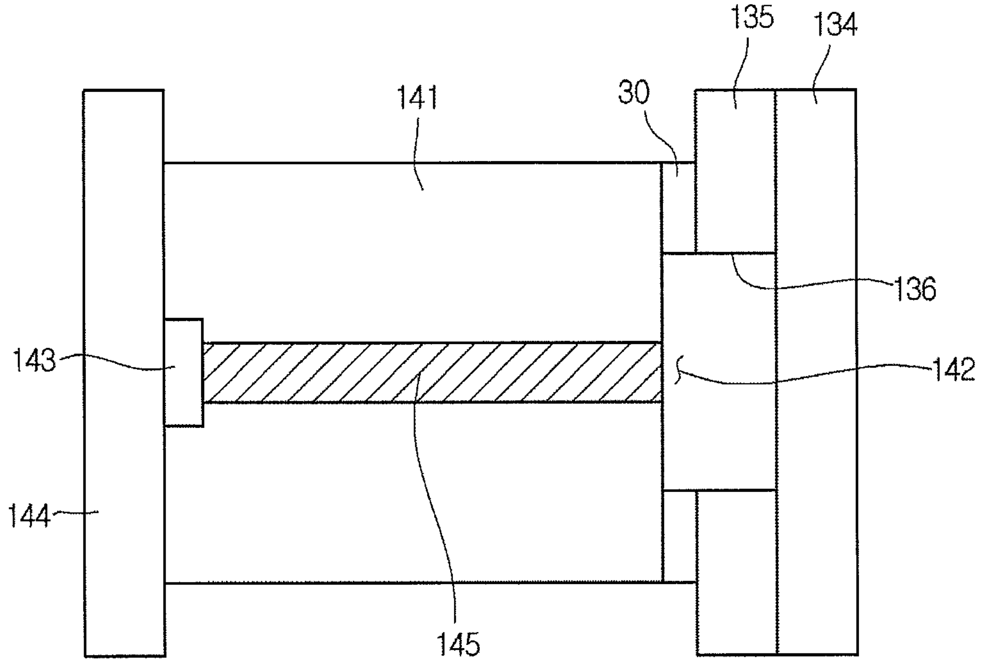
FIG. 7 is a view of a sensing unit according to a fourth embodiment.

FIG. 7 is a view of a sensing unit according to a fourth embodiment.

Referring to FIG. 7, the sensing unit 14 includes a light transmission member 141 coupled to a back surface of a display module 13, a through hole 142 defined in the light transmission member 141, an optical sensor disposed at a position corresponding to that of the through hole 142, a PCB 144 coupled to the optical sensor 143, and a light transmission auxiliary member 145 inserted into the through hole 142.

The through hole 142 that is a light transmission path is defined in the light transmission member 141.

The light transmission auxiliary member 145 is inserted into the through hole 142.

The light transmission auxiliary member 145 is inserted into the through hole 142 to minimize light losses occurring in the through hole 142 and provide a light transmission path.

Here, the light transmission auxiliary member 145 may be formed of an optical fiber or optical fiber bundle or a transparent plastic such as polycarbonate. Also, the light transmission auxiliary member 144 may have a circular or polygonal shape equal to that of the through hole 142.

As described above, according to the fourth embodiment, the light transmission auxiliary member 145 may be inserted into the through hole 142 to minimize light losses occurring during the transmission of the light, thereby precisely detecting a light luminance value.

Figure 8:
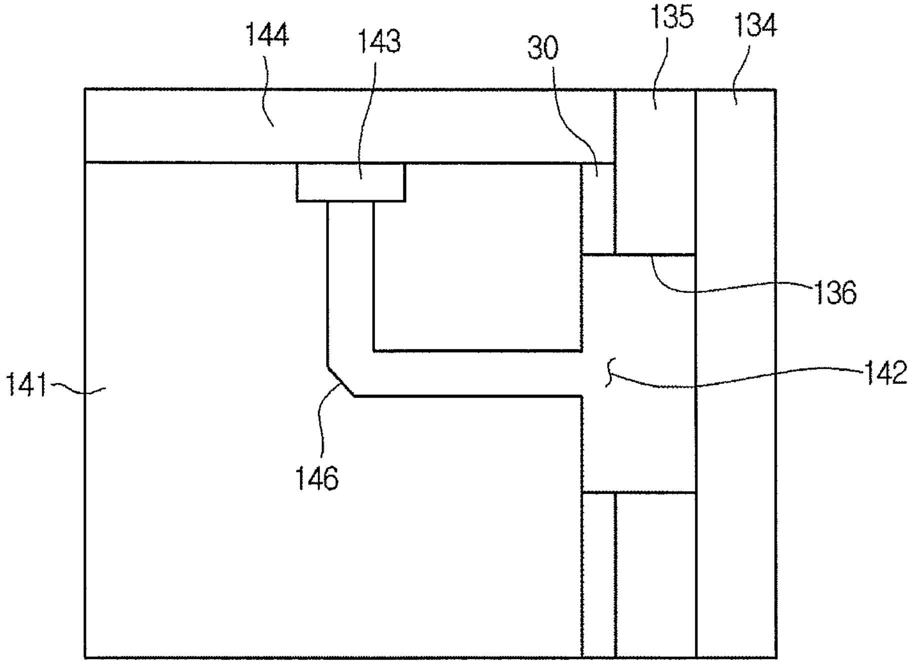
FIG. 8 is a view of a sensing unit according to a fifth embodiment.

FIG. 8 is a view of a sensing unit according to a fifth embodiment.

Referring to FIG. 8, the sensing unit 14 includes a light transmission member 141 coupled to a back surface of a bottom cover 135 of a display module 13, a through hole 142 that is a light transmission path defined in the light transmission member 141, an optical sensor 143 disposed at a position corresponding to that of the through hole 142, and a PCB 144 coupled to the optical sensor 143.

The through hole 142 that is the light transmission path is defined in the light transmission member 141.

Here, the through hole 142 has a reflective surface 146 therein and a bent shape.

That is, the through hole 142 has a first hole defined in a back surface side of a backlight assembly 134 and a second hole defined in a side surface of the display module 13 with respect to the reflective surface.

That is, when the through hole 142 is defined in only the back surface side of the display module 13, components of the optical sensor 143 should be disposed on the back surface side of the display module 13. Thus, the display device may be increased in thickness.

Thus, in the current embodiment, the through hole 142 may have a shape bent at about 90 degrees with respect to the reflective surface 146 to realize the slim display device.

The reflective surface 146 totally reflects light to provide the reflected light to the optical sensor 143.

Also, due to the above-described structure, the optical sensor 143 is disposed on a side surface of the display module 13.

Here, the through hole 142 may be changed in shape to dispose the optical sensor 143 on a top surface and a bottom surface of the display module 13.

As described above, according to the fifth embodiment, the through hole 142 may be changed in shape to realize the slim display device.

Figure 9:
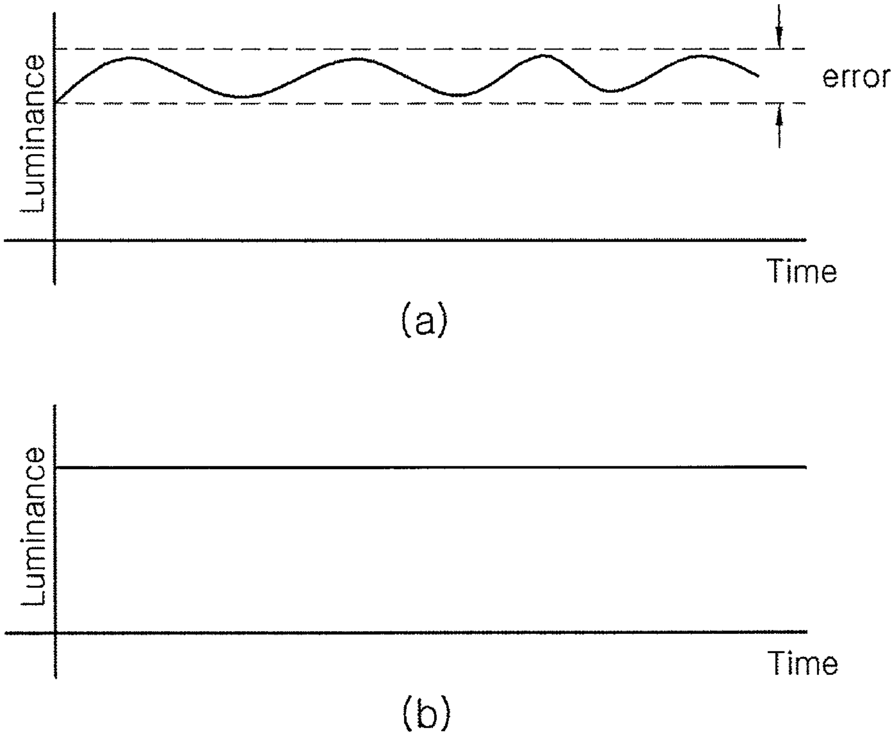
FIG. 9 is a view illustrating a luminance value detected according to an embodiment.

FIG. 9 is a view illustrating a luminance value detected according to an embodiment.

Referring to FIG. 9, in a luminance value (a) detected according to a related art, it is seen that a luminance value detected by interference of ambient light and light losses is non-uniform. That is, error probability may be increased according to the detected luminance value.

However, in a luminance value (b) detected according to the embodiments, since the light losses may be minimized by the sensing unit 14 and the interference of the ambient light may be restricted, the uniform and precise luminance value may be detected.

Figure 10:
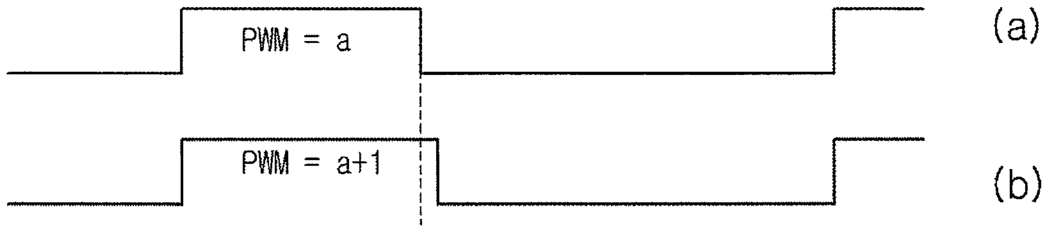
FIG. 10 is a view for explaining a PWM frequency according to an embodiment.

FIG. 10 is a view for explaining a PWM frequency according to an embodiment.

Referring to FIG. 10, a pulse width modulation (PWM) frequency for operating the backlight assembly 134 is set to a reference symbol ‘a’. Here, the reference symbol ‘a’ has 256 levels for 8 bits.

However, since 10 bits are used in the embodiments to expand the PWM frequency, the more expanded luminance of the back light unit 134 may be adjusted. When the PWM frequency is expanded, the luminance value of light generated in the back light unit 134 may be further precisely controlled. As a result, brightness may be more precisely controlled.

Figure 11:
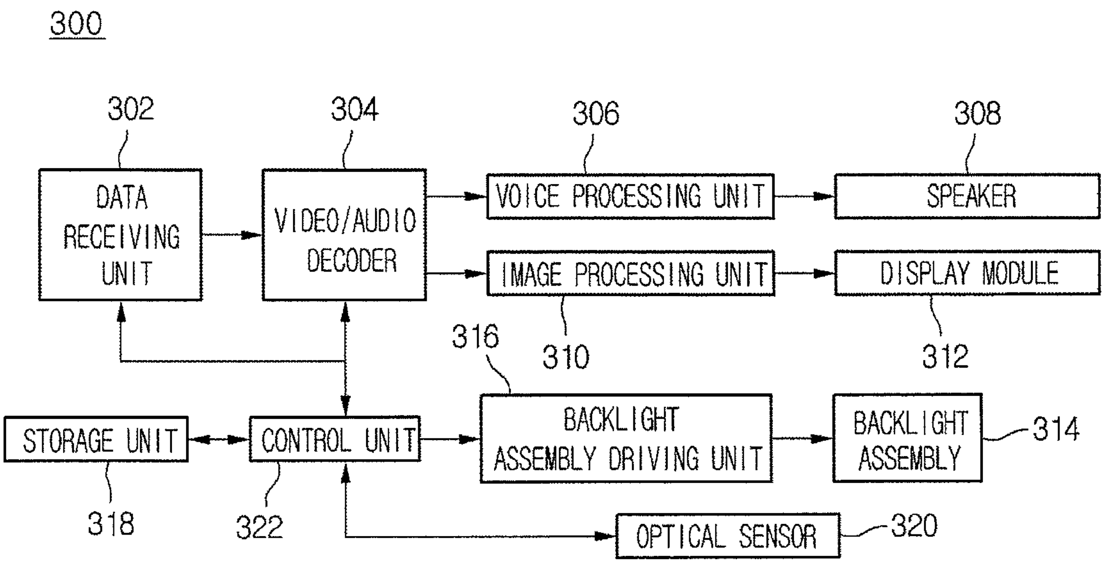
FIG. 11 is a view illustrating a configuration of a display device according to an embodiment.

FIG. 11 is a view illustrating a configuration of a display device according to an embodiment.

Referring to FIG. 11, a display device 300 includes a data receiving unit 302, a video/audio decoder 304, a voice processing unit 306, a speaker 308, an image processing unit 310, a display module 312, a backlight assembly 314, a backlight assembly driving unit 316, a storage unit 318, an optical sensor 320, and a control unit 333.

The data receiving unit 302 receives data inputted from the outside.

Here, the data receiving unit 302 may be a digital recorder such as a digital tuner for receiving a digital broadcasting signal, an analog tuner for receiving an analog broadcasting signal, digital and analog external signal input terminals connected to an external device, a personal video recorder (PVR), and a digital video recorder (DVR).

Here, the digital external signal input terminal may be an input terminal for a digital cable broadcasting signal or a terminal connected to a digital external recorder such as a DVD. The analog external signal input terminal may be a VCR signal input terminal or an input terminal for an analog cable broadcasting signal.

Also, the digital tuner may tune a transport stream (ST) of a desired channel by a user's selection in transport streams that are digital broadcasting transport signals inputted through a digital broadcasting antenna. The analog tuner may tune an image program of a desired channel by a user's selection in image programs that are analog broadcasting signals inputted through an analog broadcasting antenna.

Thus, the data received through the data receiving unit 302 may include analog and digital television broadcasting programs which run in real time, a replaying program inputted from an external player, a recording program, and a cable broadcasting program. Here, in case of the digital signal, the data includes an image signal, a voice signal, and a data signal. Also, in case of the analog signal, the data includes an image signal and a voice signal.

The video/audio decoder 304 decodes image data and voice data of the data received through the data receiving unit 302. Then, the video/audio decoder 304 transmits the decoded data into the voice processing unit 306 and the image processing unit 310.

The voice processing unit 306 performs a signal processing such as digitalization and filtering of the voice data transmitted from the video/audio decoder 304. The voice data in which the signal processing is performed is outputted through the speaker 308.

The image processing unit 310 performs a signal processing such as digitalization and filtering from the image data transmitted from the video/audio decoder 304 into RGB signals. The image data in which the signal processing is performed is displayed through the display module 312.

Although not shown, the display module 312 includes a liquid crystal panel including a plurality of gate lines and an LCD transistor, a data driver for operating the plurality of data lines according to the image data of the image processing unit 110, and a gate driver for receiving a driving signal from a timing control unit (not shown) to operate the plurality of gate lines.

The backlight assembly 314 is a lighting source for supplying light onto a front surface of the display module 312. The backlight assembly 314 includes a plurality of backlight units overlapping the display module 312.

Here, according to the embodiments, the backlight assembly 314 includes a light emitting diode (LED).

The LED may significantly reduce power consumption when compared to the existing cold cathode fluorescent lamp (CCFL), external electrode fluorescent lamp (EEFL), and flat fluorescent lamp (FFL) which are used as lighting sources.

The backlight assembly driving unit 316 supplies a driving current according to a level of luminance transmitted through the control unit 322 to the backlight assembly 314. Thus, the display module may have high luminance and a wide light emitting surface.

Here, when the backlight assembly 314 is not operated in a state an image signal is displayed through the display module 312, a user does not view the image displayed through the display module 312.

That is, when the driving current is applied to the backlight assembly 314 through the backlight assembly driving unit 316 to emit light from the backlight assembly 314, the user may view the image displayed through the display module 312.

Also, brightness of a displayed screen of the display module 312 may be adjusted by changing a driving current value supplied into the backlight assembly 314 through the control unit 322. The brightness of the displayed screen may be changed according to an increase/decrease of the driving current value supplied into the backlight assembly 314.

The storage unit 318 stores programs related to the operation of the display device 300 and various data generated during the operation of the display device 300.

Also, a preset reference luminance value of the backlight assembly 314 is stored in the storage unit 318.

The optical sensor 320 detects a luminance value of light generated through the backlight unit 314 and transmits the detected luminance value to the control unit 322.

The control unit 322 controls an overall operation of the display device 300.

Specifically, the control unit 322 compensates the luminance of the backlight assembly 314 in a case where a variation in the luminance of the backlight assembly 314 occurs.

That is, the control unit 322 compares the luminance value detected through the optical sensor 320 to the reference luminance value stored in the storage unit 318. Accordingly, when the two values do not accord with each other, driving conditions of the backlight assembly 314 are changed to allow the two values to accord with each other.

That is, when the luminance value is less or greater than the reference luminance value, the control unit 322 controls a PWM frequency supplied into the backlight assembly 314 to allow the luminance value to accord with the reference luminance value.

Specifically, the control unit 322 integrates a plurality of luminance values provided through the optical sensor 320 to calculate a mean value corresponding to the plurality of luminance values. Accordingly, the driving conditions of the backlight assembly are changed to allow the calculated mean value and the reference luminance value to accord with each other.

Figure 12:
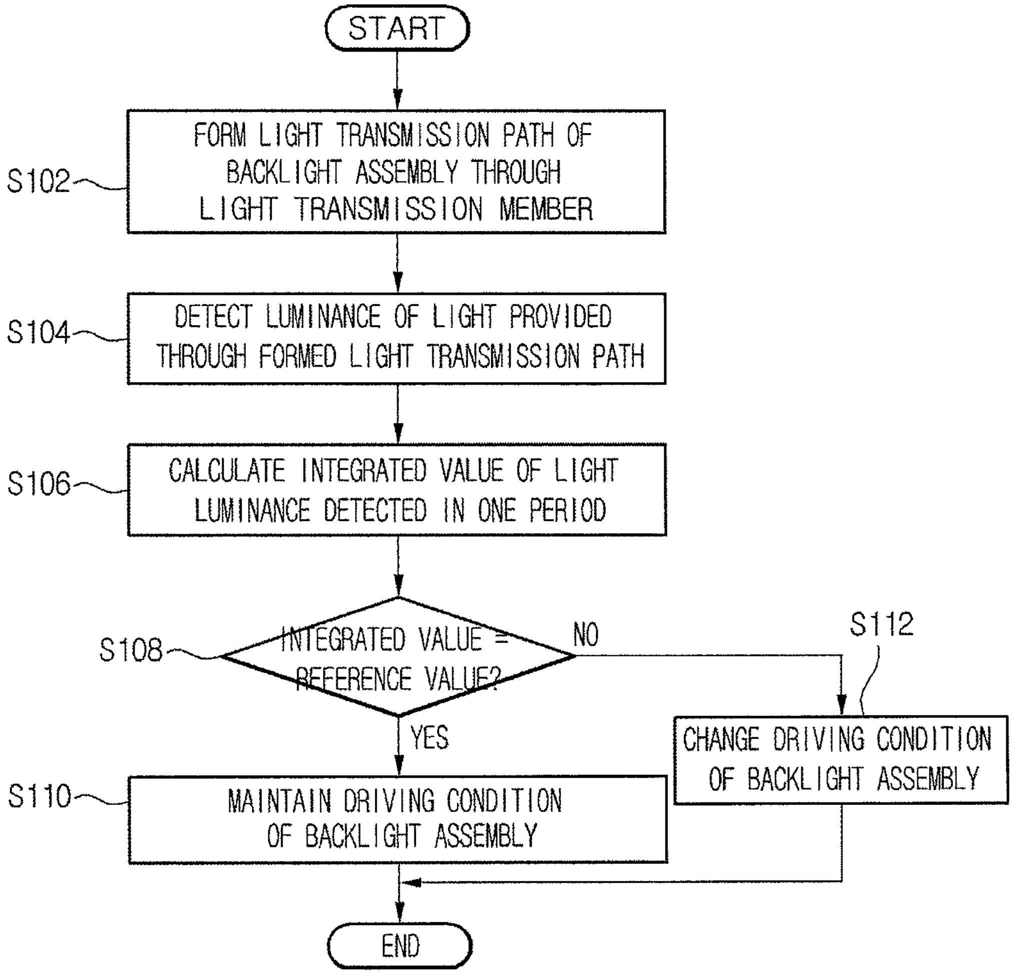
FIG. 12 is a flowchart illustrating a method of controlling a display device according to an embodiment.

FIG. 12 is a flowchart illustrating a method of controlling a display device according to an embodiment.

Referring to FIG. 12, in operation S102, a transmission path of light generated through a backlight assembly is formed in a light transmission member 141 in which a through hole 142 is defined.

Here, a light transmission auxiliary member 144 may be inserted into the through hole 142.

In operation S104, an optical sensor detects a luminance value of light provided through the through hole 142 to transmit the detected luminance value to a control unit.

In operation S106, a storage unit stores the luminance value transmitted through the optical sensor, and then the control unit integrates the plurality of luminance values detected in one period to calculate a mean value thereof.

In operation S108, the control unit compares the calculated mean value to a reference value stored in a storage unit to determine whether the two values accord with each other.

In the determination result in operation S108, when the two values accord with each other, the control unit maintains driving conditions of the backlight assembly in operation S110. On the other hand, when the two values do not accord with each other, the driving conditions of the backlight assembly are changed to allow the two value to accord with each other in operation S112.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:

a display module on which a lighting source for supplying light is disposed on a back surface thereof;

an optical sensor detecting luminance of the light supplied from the lighting source; and a light transmission member disposed between the lighting source and the optical sensor, the light transmission member comprising a through hole, the light transmission member providing a transmission path of the light generated in the lighting source to transmit the light into the optical sensor, wherein the through hole comprises an inlet disposed at a position at which the lighting source is disposed and an outlet disposed at a position at which the optical sensor is disposed, wherein the inlet of the through hole has an area greater than that of the outlet, and wherein the area through the through hole gradually decreases from the inlet to the outlet.

2. The display device according to claim 1, wherein the inlet of the through hole has a predetermined inclined angle.

3. The display device according to claim 1, wherein the inlet of the through hole and the outlet of the through hole have widths different from each other.

4. The display device according to claim 1, wherein the through hole has one shape of a circular shape, an oval shape, a triangular shape, a square shape, and a polygonal shape in section.

5. The display device according to claim 1, wherein the optical sensor is disposed on at least one surface of a back surface, a side surface, a top surface, and a bottom surface of the display module.

6. The display device according to claim 1, wherein the light transmission member further comprises a light transmission auxiliary member inserted into the light transmission member.

7. The display device according to claim 6, wherein the light transmission member comprises a seat groove on which the light transmission auxiliary member is seated, wherein the seat groove is inclined at a predetermined angle at a side thereof.

8. The display device according to claim 6, wherein the light transmission auxiliary member is formed of at least one of at least one optical fiber and a transparent plastic.

9. The display device according to claim 6, wherein the light transmission auxiliary member has one of a circular shape, an oval shape, a triangular shape, a square shape, and a polygonal shape.

10. The display device according to claim 1, further comprising a control unit changing driving conditions of the lighting source using the luminance value detected through the optical sensor.

11. The display device according to claim 10, further comprising a storage unit for storing a reference luminance value of the light.

12. The display device according to claim 11, wherein the control unit changes the driving conditions of the lighting source when an integrated value of a plurality of luminance values detected during one period is different from the reference luminance value.

13. A display device comprising:

a display module outputting an image using light supplied through a lighting source disposed on a back surface;

a light transmission member in which a through hole for providing a transmission path of the light is defined, the light transmission member comprising a through hole, the light transmission member being coupled to the back surface of the display module; and an optical sensor detecting luminance of light supplied through the through hole, wherein the through hole comprises an inlet disposed at a position at which the lighting source is disposed and an outlet disposed at a position at which the optical sensor is disposed, wherein the inlet of the through hole has an area greater than that of the outlet, and wherein the area through the through hole gradually decreases from the inlet to the outlet.

14. The display device according to claim 13, further comprising a light transmission auxiliary member inserted into the through hole.

15. The display device according to claim 14, wherein the light transmission auxiliary member is formed of at least one of at least one optical fiber and a transparent plastic.

16. The display device according to claim 13, wherein the inlet of the through hole has an inclined angle.

17. The display device according to claim 13, further comprising an adhesion member between the light transmission member and the display module.

18. The display device according to claim 14, wherein the through hole has one shape of a circular shape, an oval shape, a triangular shape, a square shape, and a polygonal shape in section.

* * * * *